US005543801A

United States Patent [19]

Shawyer

[11] Patent Number: 5,543,801

[45] Date of Patent: Aug. 6, 1996

[54] DIGITALLY CONTROLLED BEAM FORMER FOR A SPACECRAFT

[75] Inventor: Roger J. Shawyer, Hants, England

[73] Assignee: Matra Marconi Space UK Limited, United Kingdom

[21] Appl. No.: 265,912

[22] Filed: Jun. 27, 1994

[30] Foreign Application Priority Data

Sep. 3, 1993 [GB] United Kingdom .................. 9318285

[51] Int. Cl.[6] .................................................. H04B 7/185

[52] U.S. Cl. .......................... 342/354; 342/372; 342/174

[58] Field of Search .................................... 342/354, 372, 342/374, 174, 173

[56] References Cited

U.S. PATENT DOCUMENTS

| | | | |
|---|---|---|---|
| 3,964,065 | 6/1976 | Roberts et al. . | |
| 4,280,128 | 7/1981 | Masak . | |
| 4,628,321 | 12/1986 | Martin | 342/379 |
| 4,947,176 | 8/1990 | Inatsune . | |
| 4,983,981 | 1/1991 | Feldman | 342/372 |
| 5,038,146 | 8/1991 | Troychak et al. | 342/173 |
| 5,093,667 | 3/1992 | Andricos | 342/372 |
| 5,184,137 | 2/1993 | Pozgay | 342/174 |
| 5,353,031 | 10/1994 | Rathi | 342/372 |

FOREIGN PATENT DOCUMENTS

| | | |
|---|---|---|
| 0452970A3 | 10/1991 | European Pat. Off. . |
| 4218371A1 | 12/1992 | Germany . |

*Primary Examiner*—Theodore M. Blum
*Attorney, Agent, or Firm*—Kirschstein, et al.

[57] ABSTRACT

A digitally controlled beam former for a spacecraft which includes means for periodically calibrating the feed paths of the spacecraft's antenna array by measuring the apparent movement of the center of a reference signal and a nominal signal and utilising the measured data to compensate for at least the phase drift in the antenna feed paths. The measured data may also be used to compensate for amplitude and phase drift in the antenna feed paths.

9 Claims, 4 Drawing Sheets

DIGITALLY CONTROLLED BEAM FORMER FOR A SPACECRAFT

BACKGROUND OF THE INVENTION

The invention relates to a digitally controlled beam former for a spacecraft.

There is a requirement in spacecraft for active arrays for both beam forming and null operation. The key component of these active array subsystems is a digitally controlled beam former in which variation of amplitude and phase of the individual antenna elements of the spacecraft's antenna array is effected under digital control.

Experience gained from existing spacecraft highlights the difficulties of maintaining phase and amplitude calibration over the life and temperature of x-band digitally controlled beam formers. The requirements of null generation gives rise to a tight specification for these parameters and thereby temperature control within the limits ±2° C.

With a relatively large number of antenna array elements and spot beams, thermal control of the beam formers will be difficult to attain and will probably not, therefore, be an acceptable method of controlling phase and amplitude calibration of the beam forming elements.

SUMMARY OF THE INVENTION

It is an object of the present invention to provide a digitally controlled beam former for a spacecraft in which each of the N-paths of the beam former for each element of the spacecraft's receive and transmit antenna arrays is periodically calibrated against a secure tracking telemetry and command (TT&C) uplink. This calibration process not only addresses the major design problem of amplitude and drift in the antenna element feed paths but can also provide the spacecraft with a secure pointing reference which can be utilised to provide back up attitude and orbit control system (AOCS) data in the event that the main optical sensors are disabled for any reason.

The invention provides a digitally controlled beam former for a spacecraft having a multi-element antenna array and a control processor for the antenna array, the beam former including means for periodically calibrating the feed paths of the spacecraft's antenna array by measuring the apparent movement of the centre of a reference signal and a nominal signal and utilising the measured data to compensate for phase drift in the antenna feed paths. The measured data may also be used to compensate for amplitude and phase drift in the antenna feed paths.

According to one embodiment of the invention a digitally controlled beam former is provided wherein the spacecraft has N-paths containing amplitude and phase control elements for each element of the spacecraft's antenna array, wherein the antenna array processor has a number of outputs, each one of which is connected to a separate one of the N-paths for controlling the weighting applied to the amplitude and phase signals of the respective paths; and wherein the beam former includes N-beam former channels, each one of which is connected to a corresponding one of the N-paths of each of the antenna elements; and means for sequentially selecting and calibrating each of the N-channels while the other channels are operational, the weightings of the signals applied to the amplitude and phase elements of the corresponding one of the N-paths of each of the antenna elements being varied in dependence upon the difference between the initial weightings and the weightings required for a reference beam.

According to a further embodiment of the present invention a digitally controlled beam former is provided wherein the antenna array is a receive array and wherein each of the sequentially selected N-channels is calibrated in response to the receipt of a reference uplink signal from a ground transmitter of known location, the reference signal being applied to the corresponding one of the N-paths of each of the antenna elements and causes reference amplitude and phase signals indicative of the location of the source of the reference signal, to be applied thereto, any offset in both the X and Y phases of the reference beam relative to a nominal beam position being detected and applied to the antenna array processor for causing the weightings of the output signals thereof to be varied in dependence upon the level of the detected offset.

The calibration procedure for the receive array is a two stage process, wherein the reference beam for the first stage is a spread spectrum uplink signal which is received by sweeping a wide receive beam in both X and Y co-ordinates by the receive antenna to establish a coarse boresight for nominal signal weightings, and wherein the same reference beam is used for the second stage and is received by sweeping a narrow beam in both X and Y co-ordinates by the receive antenna to obtain characteristic slopes and offsets for storage by the antenna array processor and thereby variation of the corresponding signal weightings. The narrow beam may incorporate a coarse fixed offset corresponding to the offset in the X and Y phases for the coarse boresight.

According to another embodiment of the present invention a digitally controlled beam former is provided wherein the antenna array is a transmit array, wherein a reference channel is established to provide nominal coverage over a ground station, wherein a reference signal is transmitted from the spacecraft, through the reference channel, to the ground station, the reference signal being modulated by a recognition code, wherein the reference signal is swept over the ground station by the application of control signals to the amplitude and phase control elements of the N-paths of the reference channel by the antenna array processor, and wherein the signal level data received by a calibration beacon of the ground station is uplinked to, and stored by, the antenna array processor for effecting optimisation of the signal weightings applied to the reference channel and the sequential calibration of the other channels of the transmit array utilising the calibration beacon.

The calibration means for the receive and transmit arrays include switching means for each of the N-beam former channels, the switching means being adapted under the control of the antenna array processor to sequentially connect each of the channels to the reference uplink signal for calibration while the other channels are operational. The switching means for the operational channels are change over switches and the switching means for the calibration channel is a n-way switch. The switching means can be provided by high speed switch diodes, preferably in the form of monolithic microwave integrated circuits.

According to another embodiment of the present invention a digitally controlled beam former is provided which includes means for switching operation of the attitude and orbit control system (AOCS) for the spacecraft to the receive antenna array calibration means in the event of failure of the AOCS sensors, the reference channel of the calibration means being used as the AOCS channel, wherein the correlator ensures that only a spread spectrum tracking telemetry and command uplink signal from the ground station is monitored by the detector and wherein the X and Y coordinate data for the AOCS is provided by the antenna array processor.

The foregoing and other features according to the present invention will be better understood from the following description with reference to the accompanying drawings.

DETAILED DESCRIPTION OF THE INVENTION

Figure 1:
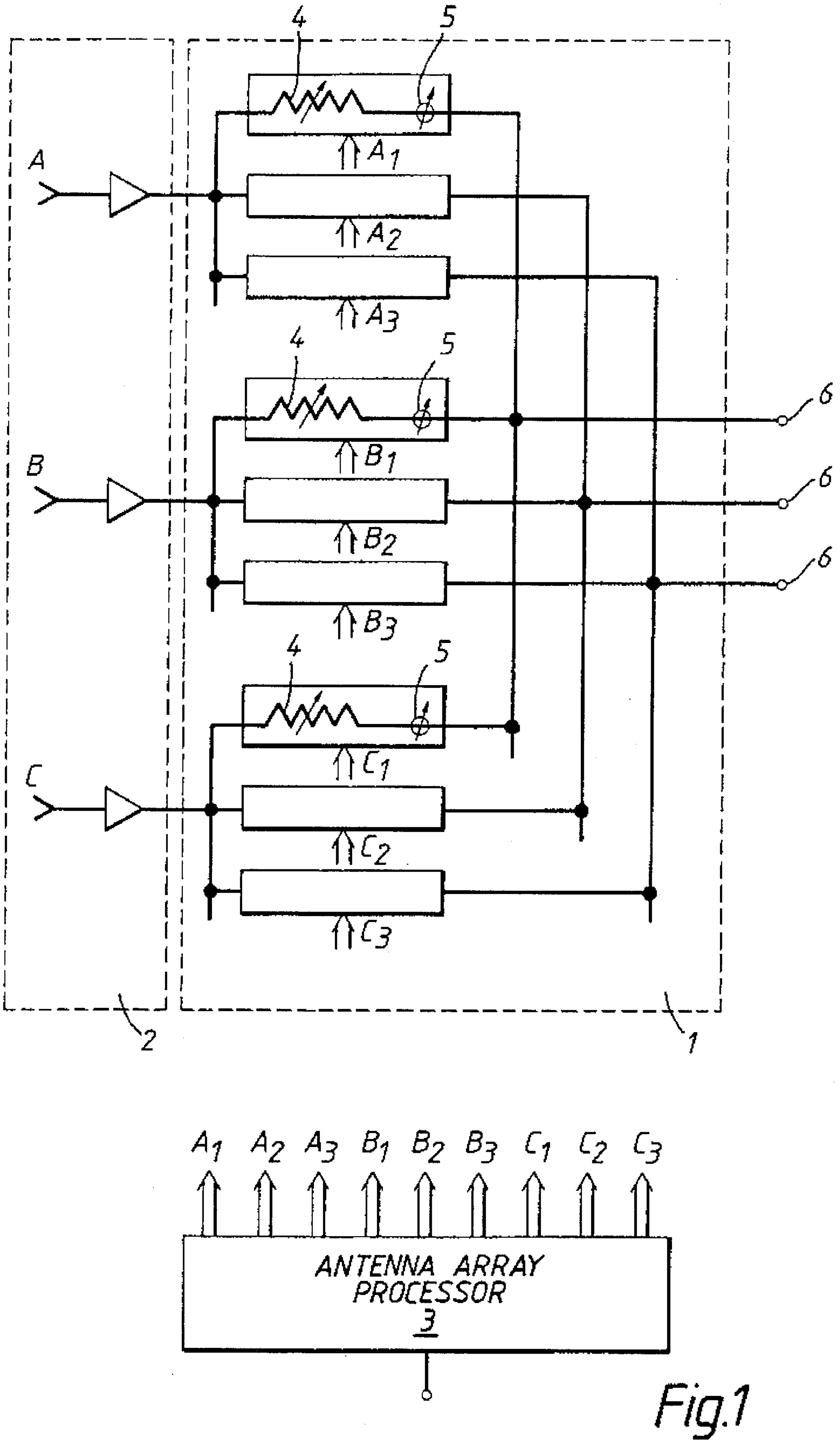
FIG. 1 diagrammatically illustrates a digital beam former for a spacecraft, in the form of a block diagram.

As is diagrammatically illustrated in FIG. 1 of the drawings, a digital beam former includes a beam forming network 1 having N-paths (1,2,3 . . . N) for each element (A, B and C) of the antenna array 2 of the spacecraft. Corresponding ones of the N-paths of each of the antenna elements (A,B,C) are connected to separate ones of a number of beam former channels 6. Each of the N-paths is connected to a separate one of the outputs ($A_1 \ldots A_N$, $B_1 \ldots B_N$, $C_1 \ldots C_N$) of an antenna array processor 3 for controlling the weighting of the signals applied to the amplitude (4) and phase (5) control elements of the respective paths (A1,A2 . . . AN, B1,$B_2$ . . . BN, C1,$C_2$ . . . CN). The signal weightings for each element of a beam are indicative of the location on the Earth to which the antenna array is pointing. Hence, calibration of the N-paths can be effected using these weightings for a specific location or region of the Earth. Only three paths are illustrated for each of the antenna elements A, B and C but, it will be directly evident to persons skilled in the art, that any number of paths, channels and antenna elements could be employed in dependence upon the specific requirements of the spacecraft's antenna array.

The antenna elements (A,B and C) include either low noise amplifiers (LNA's) for the receive arrays, or solid state power amplifiers (SSPA's) for the transmit arrays. The phase and gain of each of these elements together with their connecting cables must be calibrated.

The antenna array elements (A, B and C) are adapted to establish beams or nulls for each of the channels 6 which may then be allocated to particular uplink, or downlink, users by the on board switching subsystem (not illustrated). The beamwidths, or null depths, and their position on the Earth are generated by the different weightings applied to the amplitude and phase control signals.

Thus, a reference uplink will require reference weightings to be applied to achieve maximum received signal level. Variation of these weightings in a calibration routine will enable the reference beam on the spacecraft to be shifted in both X and Y phases. The variation in signal level will then enable on-board software to establish any offset from the nominal beam position that is required to counter drift in the amplitude and phase of the elements in the reference path.

These offsets can then be applied to any other beam or null requirements, either as a fixed offset, or as a function derived from the slope of the characteristic obtained during the calibration routine.

As, and when, one 'reference' channel is calibrated, it can be switched, in turn, to carry the traffic on each of the operational channels, whilst the elements of that channel are calibrated.

The calibration process referred to above is continuous with each channel being cycled through the calibration routine periodically, enabling short term temperature variations to be compensated.

Figure 2:
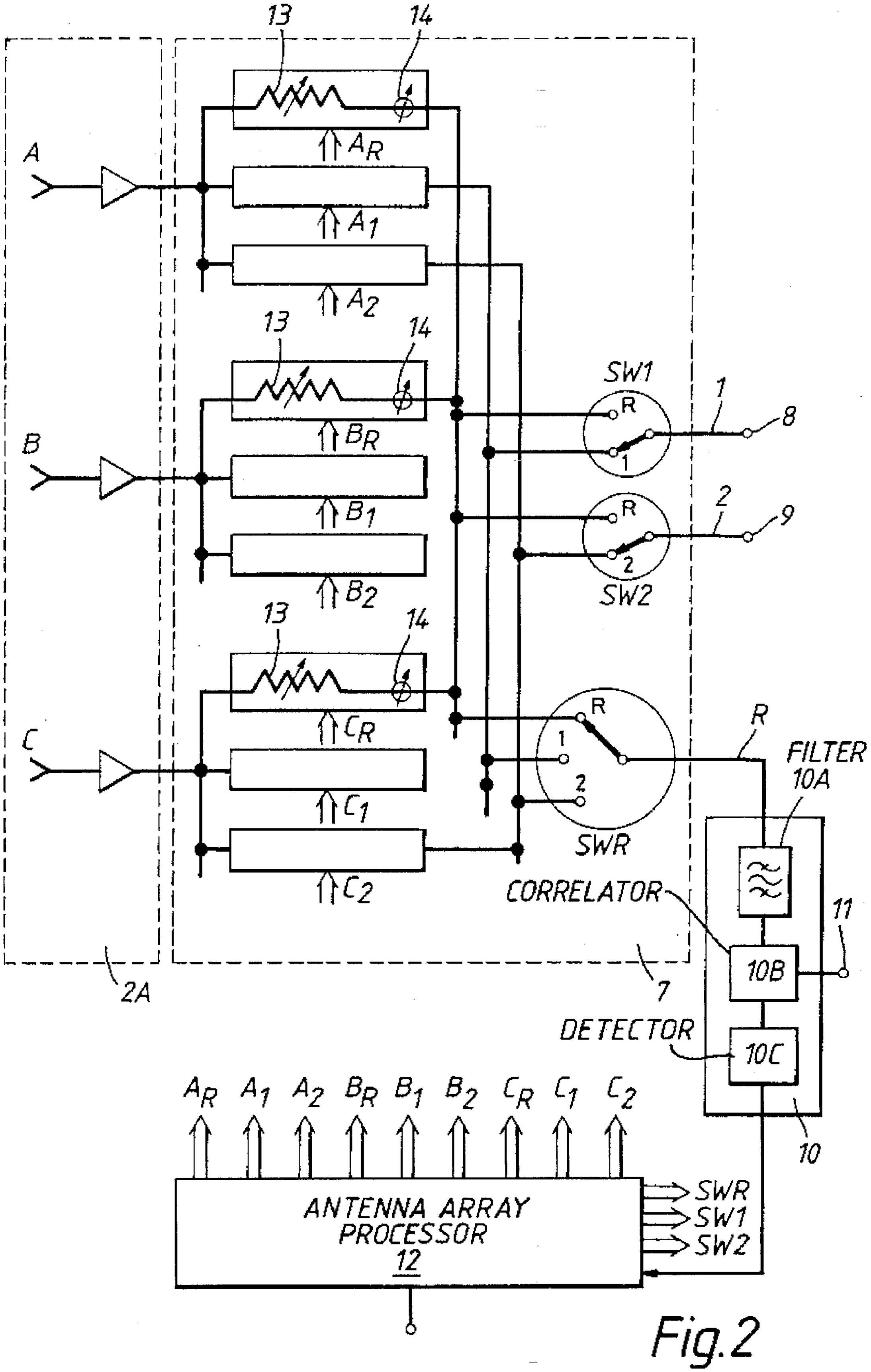
FIG. 2 diagrammatically illustrates, in the form of a block diagram, a digital beam former according to the present invention for the receive antenna array of a spacecraft.

The periodic calibration arrangement for a receive array 2A is diagrammatically illustrated, in the form of a block diagram, in FIG. 2 of the drawings. The basic structure of the beam forming network 7 of FIG. 2 is the same as the beam forming network 1 of FIG. 1 but, for the purposes of the description, only some of the connections are illustrated. In addition, one of the three channels is designated as a reference channel 'R'.

As with FIG. 1, the receive array beam former is, for the sake of simplicity, shown with three N-path channels and three corresponding antenna array elements (A, B and C) only.

As is illustrated in FIG. 2, the operational channels 1 and 2 respectively include change over switches SW1 and SW2 for connecting the channel output terminals 8 and 9 either to the N-paths (AR, BR and CR) of the reference channel 'R', or one of the other channels. In the case of channel 1, the N-paths are (A1, B1 and C1) and in the case of channel 2, the N-paths are (A2, B2 and C2).

In practice, the change over switches SW1 and SW2 can be provided by high speed switch diodes, i.e. PIN diodes, in the form of monolithic microwave integrated circuits (MMIC).

The reference channel R is switched through an n-way selector switch SWR to a simple correlation/detector unit 10 comprising a filter 10A, correlation circuit 10B and detector circuit 10C connected in series between the reference channel R and an input of an antenna array processor 12. The correlation circuit 10B is connected to an input terminal 11 and the switches SW1, SW2 and SWR are each connected to separate outputs of the processor 12.

In operation, a synchronised key code from a secure processing system (not illustrated) is applied to the unit 10 via the input terminal 11 to enable correlation with the x-band command signal to be effected. The output of the detector circuit 10C is applied to the processor 12 which controls the calibration routines and the application of control signals AR, A1, BR, B1 etc to respective ones of the amplitude (13) and phase (14) control elements of the N-paths of each of the antenna elements (A, B and C).

The processor 12 also controls the calibration cycle by providing switching signals to the switches SW1, SW2 . . . SWR.

In practice, the processor 12 will, as part of the onboard autonomy of the spacecraft, contain stored data for beam forming and null pattern generation in the form of sets of control words for each channel, for example, A1, B1, C1 etc for channel 1. The control word values are varied according to the null or beam required.

In operation, the initial calibration of the reference channel R is carried out by processor 12 causing switch SWR to be set to position R, SW1 to be set to position 1, SW2 to be set to position 2 etc.

A coarse measurement is made at the commencement of the calibration routine using a spread spectrum uplink signal centred on the nominal position of the control ground station. A wide receive beam is swept in both X and Y co-ordinates by the receive antenna and a coarse boresight is established for the nominal control words, i.e. nominal signal weightings. A narrow beam is then set up incorporating, if necessary, a coarse fixed offset. The X and Y sweeps by the receive antenna are then repeated and characteristic slopes and offsets are stored. Control word offsets are then determined for each beam, or null, and are designated ΔAR ΔBR etc. The control words for the reference channel would, therefore, become:

$$(AR+\Delta AR), (BR+\Delta BR) \text{ etc.}$$

On completion of the reference channel calibration process, the calibration of the first operational channel, i.e. channel 1 of FIG. 2, is then started by changing the reference channel control words for those used for the nominal channel 1 i.e. A1 B1 C1 etc.

Thus, having set up the reference path to Channel 1, the processor 12 causes switch SW1 to be switched to position R to maintain traffic, whilst switch SWR is switched to position 1 to enable channel 1 calibration to take place. The calibration procedure for channel 1 is exactly the same as the procedure used for the calibration of the reference channel R. The resulting offsets and slopes are stored in the array processor 12.

Based on this stored data, the corrections needed for the actual channel 1 operational settings are then determined and the control words are set up as follows:

$$(A_1+\Delta_{A1}), (B_1+\Delta_{B1}), (C_1+\Delta_{C1}) \text{ etc.}$$

The switch SW1 is then returned to position 1 by the processor 12 with traffic now being allowed to flow through the calibrated pathway whilst channel 2 is set up and calibrated in a similar manner.

The calibration procedures outlined above can be used to calibrate beam forming networks with any number of channels and antenna elements. The cycle time of the calibration process increasing with system complexity.

Figure 3:
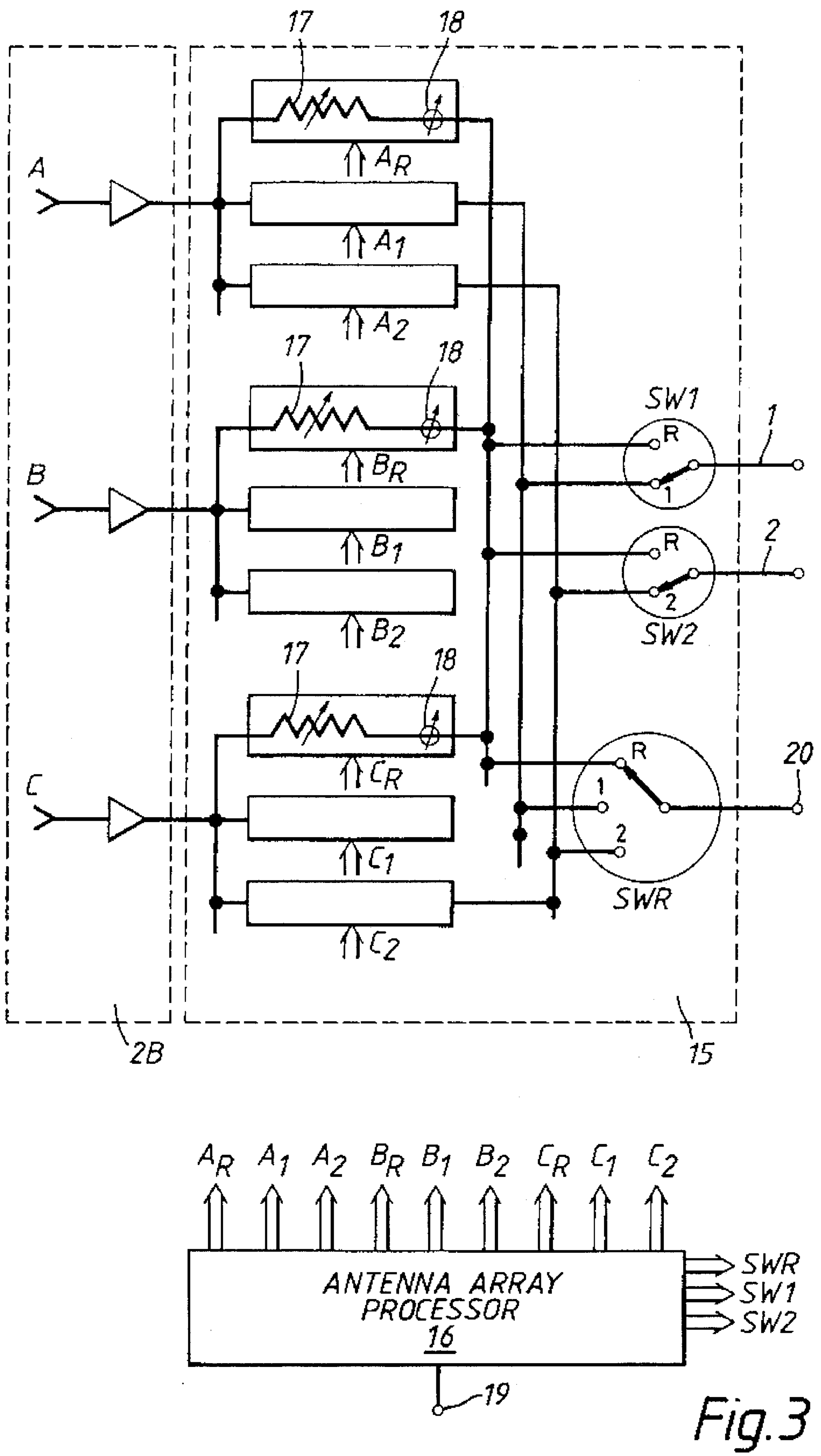
FIG. 3 diagrammatically illustrates, in the form of a block diagram, a digital beam former according to the present invention for the transmit antenna array of a spacecraft.

The periodic calibration arrangement for a transmit antenna array 2B is diagrammatically illustrated, in the form of a block diagram, in FIG. 3 of the drawings. The basic structure of the beam forming network 15 of FIG. 3 is the same as the beam forming network 7 of FIG. 2 and, as with FIGS. 1 and 2, only three N-path channels and three corresponding antenna array elements (A, B and C) are shown for the sake of simplicity.

The transmit beam former calibration procedures are basically the same as the calibration procedures for the receive beam former, but involve active participation of the control ground station (not illustrated) and the detector is part of the ground station equipment.

The transmit antenna array processor 16 is used to effect operation of the switches SW1, SW2 and SWR and to apply the weighted signals (AR, A1 . . . etc) to the corresponding amplitude (17) and phase (18) control elements of the N-paths of each antenna element (A, B and C).

A reference channel R is first set up to provide nominal coverage over the ground station. A beacon signal is then transmitted from the spacecraft to the ground station. This signal which is transmitted through the reference channel is modulated by a simple recognition code. The beam is swept by on-board generated control signals to the amplitude (17) and the phase (18) control elements, with detection data being measured on the ground. The received signal level data is then uplinked over the secure command link 19 to the processor 16 and the reference channel is optimised.

As with the receive beam former of FIG. 2, the reference channel path is then cycled, in turn, through the operational channels (1, 2, . . . etc). The operational channel paths are then calibrated using the calibration beacon with the resulting slope and offset data being calculated and stored in the array processor 16. As the required beams are selected, the appropriate offsets are calculated for the control words and the beams set up accordingly.

The transmit calibration routine will of necessity be slower than the receive calibration routine, due to the time delay inherent in transmitting signal level data from the ground station. Since a spot transmit beam can be used, the total transmit power required for the calibration beacon will be minimal, the control ground station will have a good Gain/Temperature performance and the beacon is narrow band.

The AOCS, referred to above, normally relies on input data from optical sensors, typically infra red sensors, to provide a reference to establish the attitude of the spacecraft. With infra red sensors, the edge of the Earth is detected and used as a reference point for the AOCS.

However, in the event that such sensors are disabled for any reason, then control of the spacecraft would be seriously impaired, if not, totally lost. It is, for these reasons, that much effort is being directed towards overcoming these problems.

It has been recognised that it may not be possible to make spacecraft completely immune from laser attack and alternative spacecraft altitude and orbit control systems have been proposed.

Since the calibration procedure of the present invention effectively measures the movement of boresight from the uplink transmitter position, for whatever reason, it can, therefore, be used to continuously update the AOCS with X and Y co-ordinate data. The beamwidth of this control beam can be extended to beyond Earth cover for coarse positioning data, or reduced to the minimum spot size for fine position control.

Figure 4:
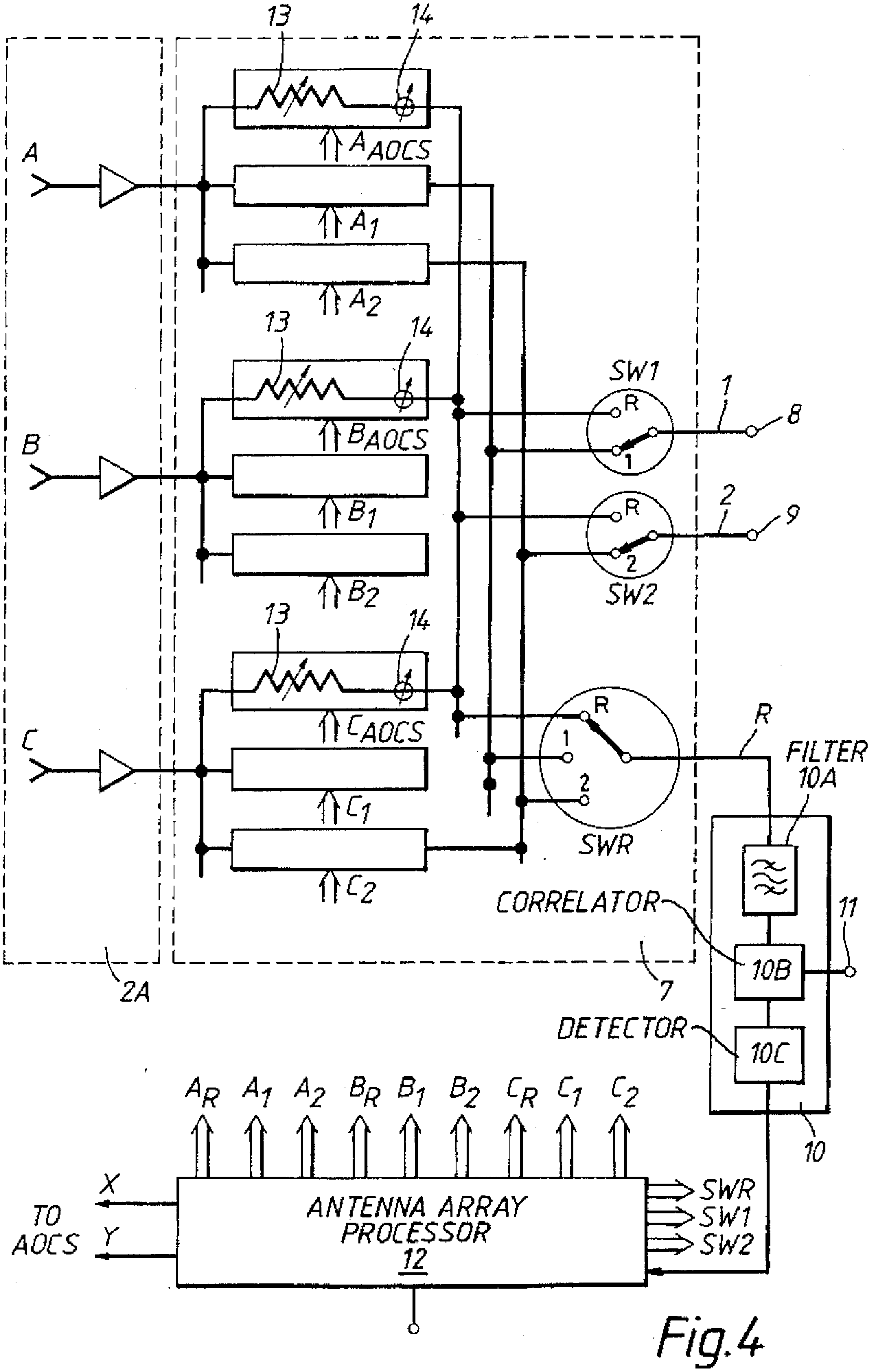
FIG. 4 diagrammatically illustrates, in the form of a block diagram, the digital beam former illustrated in FIG. 2 adapted for operation in AOCS mode.

Thus, the periodically calibrated receive beam former of FIG. 2 can be modified in the manner diagrammatically illustrated, in the form of a block diagram, in FIG. 4 of the drawings for operation in the AOCS mode. The reference channel R is used as the AOCS channel.

As stated above, the basic application of the periodically calibrated beam former of FIG. 2 is to compensate for amplitude and phase drift in the antenna feed paths by measuring the apparent movement of the centre of the TT&C uplink beam from its transmitter position on the Earth. This movement could equally be caused by a change in the altitude of the spacecraft if the normal AOCS sensors are subject to interference.

Thus, in the event that the AOCS sensors are disables for any reason, the apparent shift resulting from the calibration routine being applied to the designated AOCS channel of FIG. 4, would provide the X and Y co-ordinate data for the AOCS system at the X and Y outputs of the processor 12. During this period, the accuracy of the spacecraft altitude will be dependent upon the stability of the amplitude (13) and phase (14) control elements which form part of the antenna array feed paths for the designated channel.

In order to cater for extended AOCS mode, some of the control elements of the designated AOCS beam would be temperature controlled. The number of such elements would be limited to a sub-set of those required to solely place the AOCS spacecraft receive beam over the transmitter position on Earth.

With the arrangement of FIG. 4, the use of the correlation circuit 10B of the unit 10 will ensure that only the spread spectrum TT&C uplink is monitored by the detector because any interfering signal will be reduced to insignificant levels by the narrow bandwidth of the detector.

Whilst the calibration procedures outlined above effect compensation for both amplitudes and phase drift in the antenna feed path, it may, with some systems, only be necessary to compensate for phase drift.

The primary objective of periodic calibration is to compensate temperature and life drifts of the active and passive elements in each beam forming path. As stated above, the achievement of the required stability for the paths on existing spacecraft gives rise to a temperature control requirement of ±2° C.

Assuming that there will be a continuing requirement for similar phase and amplitude stabilities and using a maximum rate of change of temperature for payload equipments of 2° C./Min, it is considered that a minimum calibration cycle time of one minute will be required.

It should be noted that 2° C./Min is the normal design restraint applied to a thermal subsystem for an eclipse/sunlight change and therefore represents a worst case condition.

For a 12 channel beam former feeding a 200 element antenna array, each Complete calibration cycle represents less than 200 KBits of data, or a data processing rate of 3.3 KBits/sec for the array processor.

The transmit beam former calibration requires less than 20 KBits of signal level data per cycle. This leads to a maximum uplink data rate of 333 bits per sec on the secure command link.

For most of the operational life of the system, rates of change of temperature will be very much lower than the maximum, and hence calibration cycle times can be significantly extended. The calibration procedure could also make use of variable cycle time dependent on measured drift rates or orbital timing.

We claim:

1. A digitally controlled beam former for a spacecraft having a multi-element antenna array and a control processor having N-outputs for each element of the antenna array, the beam former comprising:

N-paths for each element of the antenna array, each of the N-paths being connected to a separate one of the outputs of the control processor for controlling weightings applied to amplitude and phase signals of a respective N-path;

N-beam former channels, each one of which is connected to a separate one of the N-paths for each element of the antenna array, a nominal beam associated with each of the N-paths having a first beam position corresponding to a respective region on earth; and calibration means for periodically calibrating each of the N-paths of each element of the spacecraft's antenna array using a reference beam having a second beam position corresponding to a specific region on earth, the calibration means being adapted to measure any offset of the second beam position from said specific region using an uplink at said specific region, the measured offset being used by the control processor to compensate for phase drift in the N-paths for each element of the antenna array.

2. A digitally controlled beam former as claimed in claim 1, wherein the calibration means is operative for sequentially selecting and calibrating each of the N-beam former channels while the other N-beam former channels are operational, the weightings of the amplitude and phase signals of a selected N-path being varied in dependence upon a difference between initial weightings and final weightings required for the reference beam.

3. A digitally controlled beam former as claimed in claim 2, wherein the antenna array is a receive array, and wherein each of the sequentially selected N-beam former channels is calibrated in response to receipt of a reference uplink signal from a ground transmitter at said specific region, the measured offset in both X and Y phases of the reference beam relative to the reference uplink signal being detected and applied to the control processor for causing the weightings to be varied in dependence upon the level of the measured offset.

4. A digitally controlled beam former as claimed in claim 3, wherein the reference uplink during a first stage of calibration is a spread spectrum uplink signal which is received by sweeping a wide receive beam in both X and Y co-ordinates by the receive array to establish a coarse boresight for nominal weightings, and wherein the same reference uplink during a second stage of calibration is received by sweeping a narrow beam in both X and Y co-ordinates by the receive array to obtain characteristic slopes and offsets for storage by the control processor.

5. A digitally controlled beam former as claimed in claim 4, wherein the narrow beam incorporates a coarse fixed offset corresponding to the offset in the X and Y phases for the coarse boresight.

6. A digitally controlled beam former as claimed in claim 2, wherein the antenna array is a transmit array, wherein a reference transmit beam is established to provide nominal coverage over said specific region, said reference beam being modulated by a recognition code, wherein the reference transmit beam is swept over the ground station by the application of control signals to the elements of the N-paths of the reference channel by the control processor, and wherein the ground station generates said uplink which is stored by, the control processor for effecting optimization of the weightings applied to the reference transmit beam and the sequential calibration of the other channels of the transmit array utilizing the uplink.

7. A digitally controlled beam former as claimed in claim 4, wherein the calibration means include correlation and detection means for the reference uplink signal.

8. A digitally controlled beam former as claimed in claim 1, wherein the spacecraft has an attitude and orbit control system (AOCS) including sensors for sensing the attitude of the spacecraft, wherein the beam former further includes means for switching operation of the AOCS for the spacecraft to the calibration means in the event of failure of the AOCS sensors, wherein X and Y co-ordinate data for the AOCS is provided by the control processor.

9. A spacecraft, comprising:

a digitally controlled beam former, said former having a multi-element antenna array and a control processor having N-outputs for each element of the antenna array, the beam former comprising:

N-paths for each element of the antenna array, each of the N-paths being connected to a separate one of the outputs of the control processor for controlling weightings applied to amplitude and phase signals of a respective N-path;

N-beam former channels, each one of which is connected to a separate one of the N-paths for each element of the antenna array, a nominal beam associated with each of the N-paths having a first beam position corresponding to a respective region on earth; and calibration means for periodically calibrating each of the N-paths of each element of the spacecraft's antenna array using a reference beam having a second beam position corresponding to a specific region on earth, the calibration means being adapted to measure any offset of the second beam position from said specific region using an uplink at said specific region, the measured offset being used by the control processor to compensate for phase drift in the N-paths for each element of the antenna array.

* * * * *